United States Patent [19]

Downing

[11] 4,214,849
[45] Jul. 29, 1980

[54] RETRACTABLE RAIL FOR A VEHICLE LIFT

[75] Inventor: Harold A. Downing, Hutchinson, Kans.

[73] Assignee: Collins Industries, Inc., Hutchinson, Kans.

[21] Appl. No.: 959,760

[22] Filed: Nov. 13, 1978

[51] Int. Cl.² ............................................... B60P 1/46
[52] U.S. Cl. .................................... 414/545; 414/921
[58] Field of Search ............... 414/540, 541, 545, 921; 187/9 R; 182/106

[56] References Cited

U.S. PATENT DOCUMENTS

| 3,710,962 | 1/1973 | Fowler, Jr. ........................ 414/545 |
| 3,847,292 | 11/1974 | Williams et al. ................... 414/541 |
| 4,083,429 | 4/1978 | Abbott ............................. 414/541 X |
| 4,113,121 | 9/1978 | Collins et al. .................... 414/921 X |
| 4,138,023 | 2/1979 | Rohrs et al. ...................... 414/921 X |
| 4,142,641 | 3/1979 | Dake ................................. 414/541 |

OTHER PUBLICATIONS

Advertising brochure "Safety Lift by Collins".

Primary Examiner—Stephen G. Kunin
Assistant Examiner—Terrance L. Siemens
Attorney, Agent, or Firm—Edwin H. Crabtree

[57] ABSTRACT

A retractable rail for mounting on a platform of a vehicle lift. The rail folded on top of the platform when the platform is raised into a substantially vertical position in an opening in the vehicle. The rail unfolded and extending upwardly on the platform when the platform is lowered into a horizontal position adjacent the opening in the vehicle. The rail provides the safety feature of allowing the user of the vehicle lift to grip the rail to maintain his balance during the use of the lift as it is raised and lowered adjacent the vehicle.

7 Claims, 6 Drawing Figures

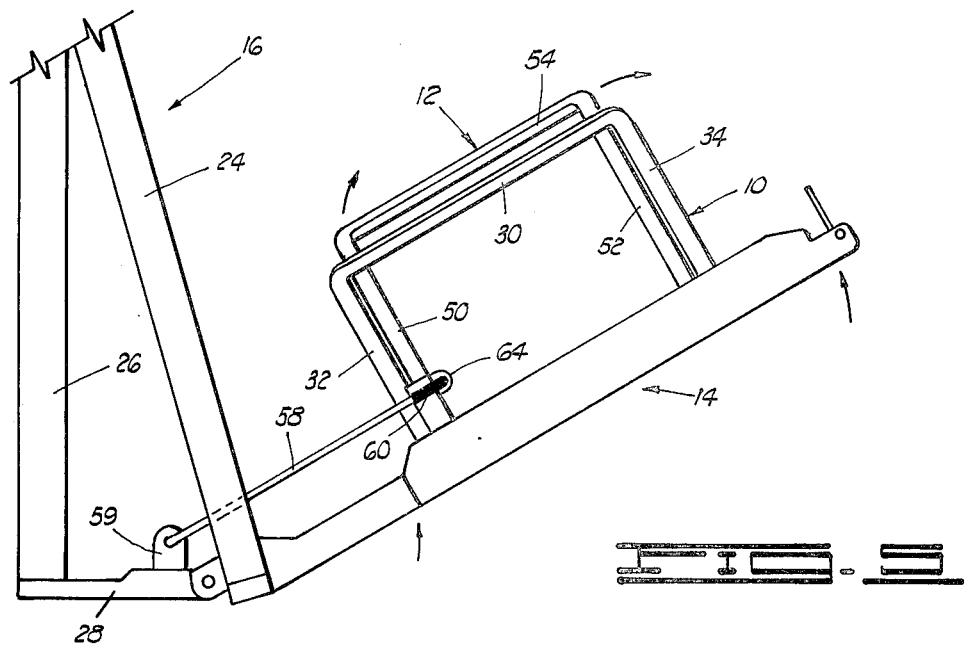
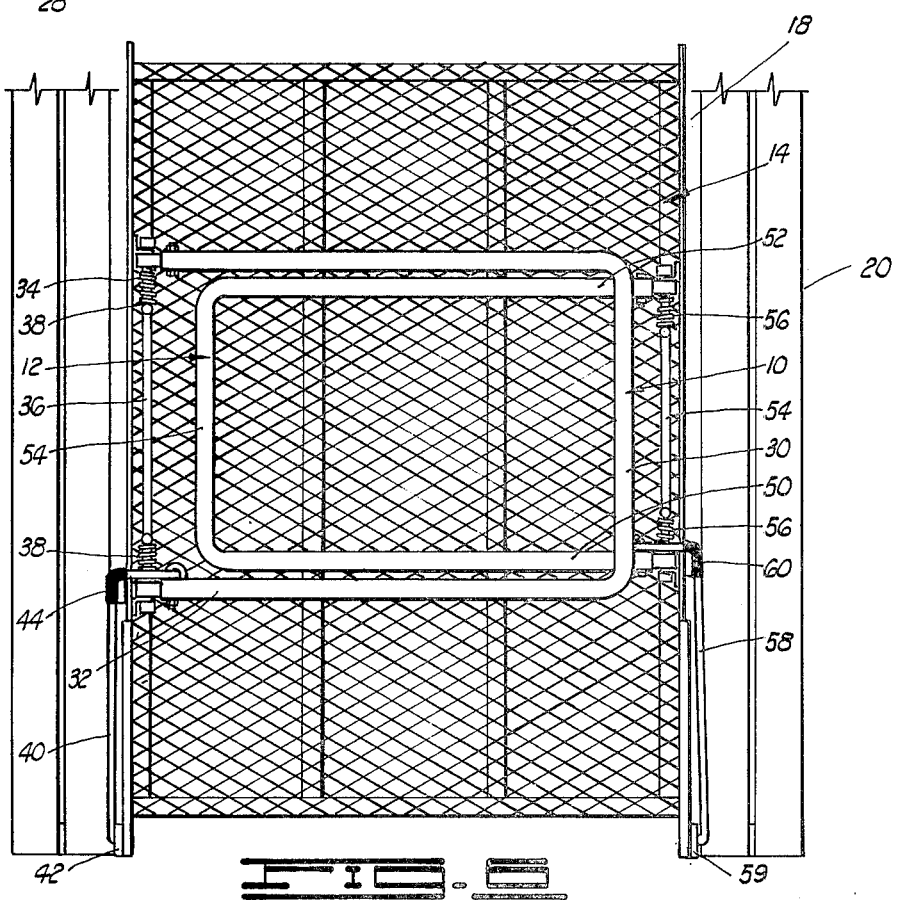

RETRACTABLE RAIL FOR A VEHICLE LIFT

BACKGROUND OF THE INVENTION

This invention relates generally to a handrail and more particularly, but not by way of limitation, to a retractable handrail for mounting on a vehicle lift. The vehicle lift is mounted in an opening in the vehicle and lowered from a substantially vertical position in the opening to a horizontal position adjacent the opening in the vehicle.

Heretofore there have been various types of handrails as disclosed in U.S. Pat. No. 4,029,223 and U.S. Pat. No. 4,039,091 to Adamski et al. In these patents a stationary railing is attached to a platform used by a disabled person in a wheelchair. The platform does not provide means for lowering the railing when the platform is retracted into the vehicle. U.S. Pat. No. 4,058,228 to Hall also discloses an extendable platform for handling a disabled person in a wheelchair, but here again, a handrail is shown which is maintained in a fixed position.

In U.S. Pat. No. 2,551,345 to Scott a portable stairway is disclosed which is foldable and includes a handrailing which is also foldable when the stairs are collapsed. The structure of the railing in this patent is substantially different from the structure of the subject invention as disclosed herein.

Prior to the subject invention, none of the prior art vehicle lifts have provided a novel retractable rail for mounting on a vehicle lift which will automatically lower and raise as the platform of the lift is raised and lowered on the vehicle.

SUMMARY OF THE INVENTION

The subject retractable rail for a vehicle lift provides the user of a vehicle lift a handrail which may be gripped by a person on the platform of the vehicle lift as the lift is being operated or may be used by a disabled person in a wheelchair as the wheelchair is raised and lowered on the platform of the lift.

The retractable rail automatically folds and unfolds as the platform of the vehicle lift is raised into a substantially vertical position in the opening of the vehicle or when it is lowered into a horizontal position adjacent the opening of the vehicle.

The invention may also include a pair of retractable rails disposed on opposite sides of the platform so that the rails may be gripped on both sides of the platform as the platform is raised and lowered.

The retractable rail, when folded on top of the platform of the lift when the lift is raised into a vertical position in the vehicle, takes up little or no space in the vehicle since it is folded directly on top of the platform in the vehicle. When a pair of retractable rails are used, one of the rails is folded on top of the other again taking up little or no space in the vehicle.

The retractable rail is simple in design, rugged in construction, and is readily adaptable for various types of vehicle lifts used on different types of vehicles for loading and unloading objects thereon or in the handling of disabled persons in wheelchairs.

The retractable rail is automatically operated by mechanical means and does not require or depend on a power source such as an electric, motor, hydraulic pump, or any other type of power source for raising and lowering the retractable rail on the platform of the lift.

The retractable rail for a vehicle lift includes a hand support for gripping by hand. The hand support is mounted on top of a first post. The first post is pivotally attached to a pivot shaft attached to a platform of the vehicle lift. The pivot shaft includes a coil spring mounted thereon. The coil spring engages the post and biases the post downwardly into a lowered position on top of the platform when the platform is raised from a horizontal position to a substantially vertical position in the door opening of the vehicle. A pivot cable having one end attached to the lift and the other end attached to the post automatically raises the post and the hand support. By placing tension on the pivot cable the bias force of the coil spring is overcome and the post and handrail are raised upwardly into a vertical position above the platform when the platform is lowered into a horizontal position adjacent the opening of the vehicle.

The advantages and objects of the invention will become evident from the following detailed description when read in conjunction with the accompanying drawings which illustrate the preferred embodiments of the invention.

BRIEF DESCRIPTION OF THE DRAWINGS

FIG. 5 is a side view of the platform in a partially raised position illustrating the two retractable rails folding one on top of the other.

FIG. 6 is a front view of the platform of the vehicle lift in a raised vertical position with the two retractable rails folded one on top of the other.

DETAILED DESCRIPTION OF THE DRAWINGS

Figure 1:
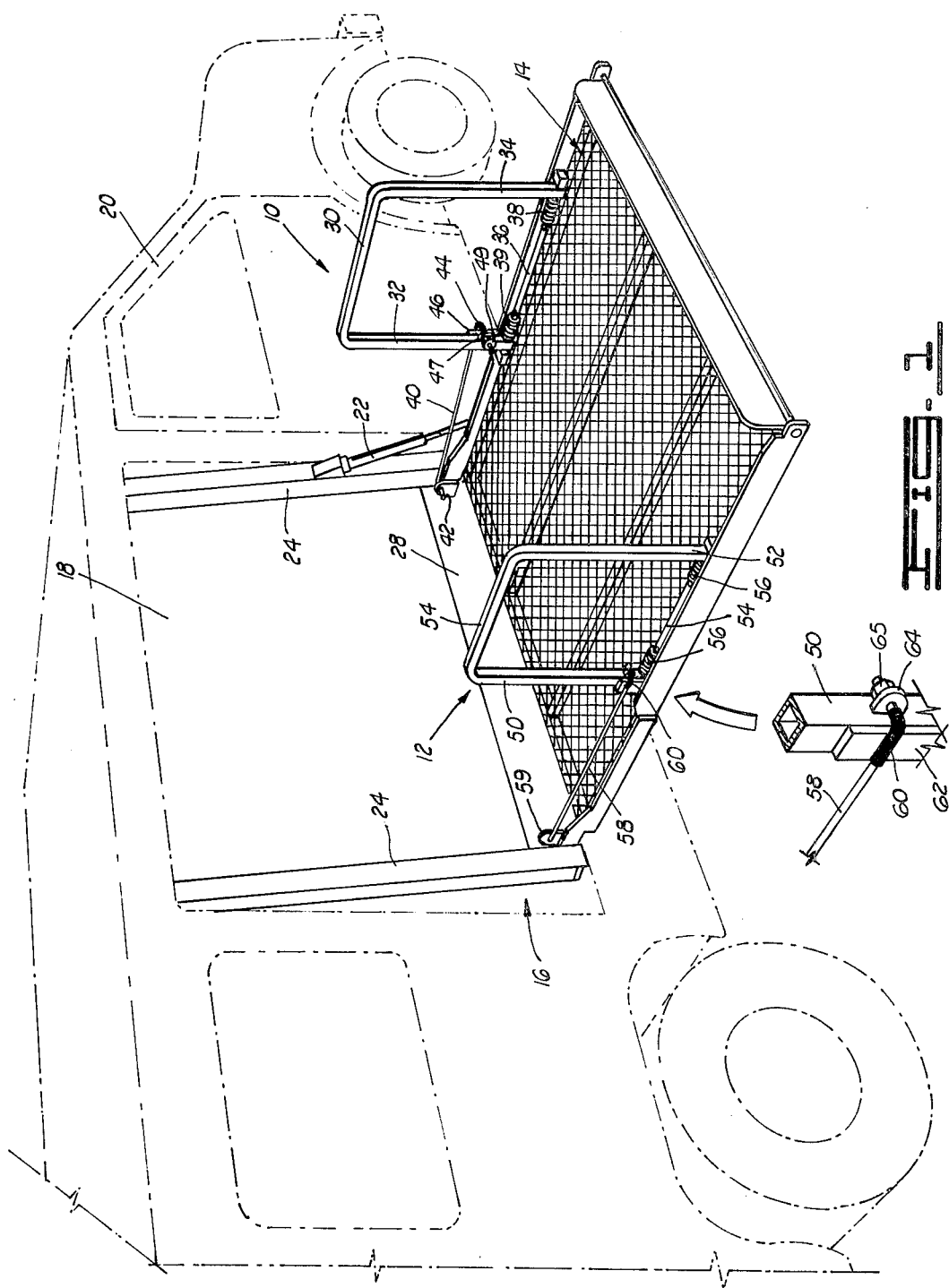
FIG. 1 illustrates a perspective view of a pair of retractable rails mounted on a platform of the vehicle lift disposed in an opening in the side of a vehicle.

In FIG. 1 a pair of retractable rails are shown and designated by general reference numerals 10 and 12. The two retractable rails 10 and 12 are similar in structure except that they are mounted on opposite sides of a platform 14 which is part of a vehicle lift 16 shown mounted in an opening 18 in the side of a vehicle 20.

The vehicle lift 16 includes an electrically operated screw 22 mounted on a telescoping hydraulic cylinder housing 24. There are a pair of cylinder housings 24 pivotally attached to stanchion tubes 26 shown in FIG. 5. The stanchion tubes 26 are mounted inside the opening 18 and disposed on top of a base channel 28. The electric screw 22 lowers the platform 14 from a substantially vertical position in the opening 18 into a horizontal position adjacent the opening 18. The telescoping hydraulic cylinder housings 24 house a pair of hydraulic cylinders which are not shown in the drawings used for lowering the platform 14 to a position on top of the ground surface and adjacent the vehicle 20. The lift 16 is used for loading and unloading objects thereon and in handling of the handicapped confined to a wheelchair. The lift 16 is described and claimed in a patent application entitled A VEHICLE WHEELCHAIR LIFT, Ser. No. 733,242 filed Oct. 18, 1976, now U.S. Pat. No. 4,138,023 and assigned to Collins Industries, Inc., Hutchinson, Kansas. It should be noted that the subject invention provides a much needed accessory to the lift 16 since it is in the interest of safety to assure people operating and riding on the lift 16 that they can maintain their balance on the platform 14 by gripping the retractable rails 10 and 12 as the platform 14 is raised and lowered.

The retractable rail 10 includes a first hand support 30 with one end attached to an upper end portion of a first post 32. The other end of the first hand support 30 is attached to the upper end portion of a second post 34. The first post 32 and second post 34 are pivotally mounted on a first pivot shaft 36 attached to one of the sides of the platform 14. The pivot shaft 36 includes a pair of coil springs 38 disposed around the ends of the pivot shaft 36. The coil springs 38 engage the first post 32 and second post 34 for biasing the posts 32 and 34 along with the first hand support 30 downwardly into a folded position on top of the platform 14 when the platform 14 is raised into a vertical position in the opening 18 of the vehicle 20.

When the platform 14 is in a lowered horizontal position as shown in FIG. 1 the first retractable rail 10 is held in a vertical position by a first pivot cable 40 having one end attached to a first channel cable bracket 42 mounted on one end of the base channel 28. The other end of the pivot cable 40 is attached to the lower end portion of the first post 32. The cable 40 is guided onto the first post 32 by a first cable guide elbow 44 mounted on a first cable post bracket 46 attached to the side of the platform 14. The end of the cable 40 is disposed through a U-shaped bracket 47 attached to the post 32 with a lock nut 49 securing the cable 40 thereto. This structure is similar to that shown in an enlarged partial view under the description of the second retractable rail 12.

When the platform 14 is lowered from a vertical position in the opening 18 of the vehicle 20, the distance between the channel cable bracket 42 and the lower end portion of the first post 32 increases, thereby placing the pivot cable 40 in tension. The tension placed on the cable 40 overcomes the bias force placed on the first rail 10 by the springs 38 thereby pivoting the rail 10 upwardly into a vertical position when the platform 14 is lowered into a horizontal position as shown.

As mentioned above the second retractable rail 12 is similar in structure to the retractable rail 10 except the distance between a third post 50 and a fourth post 52 attached to a second hand support 54 is less than the distance between the first post 32 and the second post. This allows the second rail 12 to be folded between the first post 32 and second post 34 of the rail 10 when the rails 10 and 12 are folded on top of the platform 14 as shown in FIG. 6.

The third post 50 and fourth post 52 are pivotally mounted on a second pivot shaft 54 having a pair of coil springs 56 mounted on the ends thereof and engaging the lower end portion of the posts 50 and 52 for biasing the second rail 12 downwardly on top of the platform 14. A second pivot cable 58 is attached at one end to a second channel cable bracket 59 mounted on the base channel 28. The other end of the cable 58 is attached to the lower end portion of the third post 50. An enlarged partial view of the lower end portion of the post 50 is shown to more clearly illustrate the cable 58 guided through a second cable guide elbow 60 mounted on a second cable post bracket 62 which is attached to the platform 14. The end of the cable 58 is disposed through a U-shaped bracket 64 attached to the post 50 with a lock nut 65 securing the cable 58 thereto.

As discussed in the description of the first retractable rail 10 the second retractable rail 12 is raised in an extended position as shown in FIG. 1 when the distance between the second channel cable bracket 60 and the third post 50 is increased placing the second pivot cable 58 in tension thereby overcoming the bias force of the springs 56 and raising the second retractable rail 12 into a vertical position on the platform 14.

Figure 2:
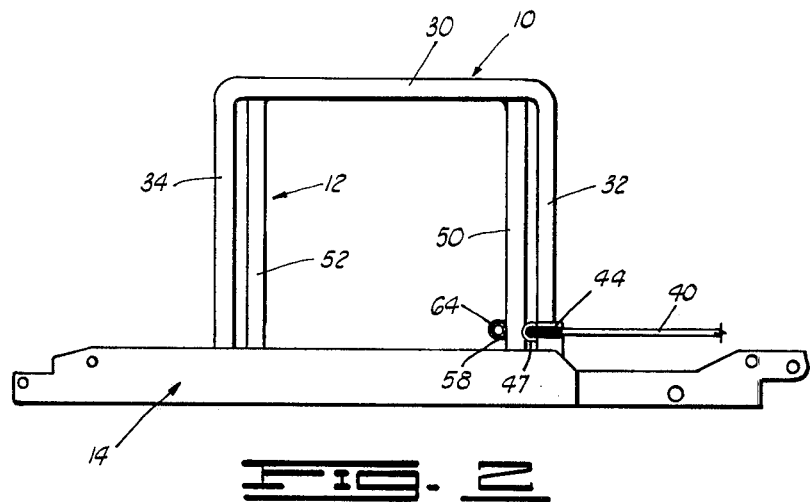
FIG. 2 is a side view of the retractable rails mounted on the platform of the vehicle lift.

In FIG. 2 a side view of the first rail 10 and second rail 12 are shown in a raised vertical position on top of the platform 14. In this view the third post 50 and fourth post 52 of the second rail 12 can be seen between and opposite the first post 32 and second post 34 of the first rail 10. Also in this view the ends of the first pivot cable 40 and second pivot cable 58 can be seen attached to the lower portion of the first post 32 and third post 50.

Figure 3:
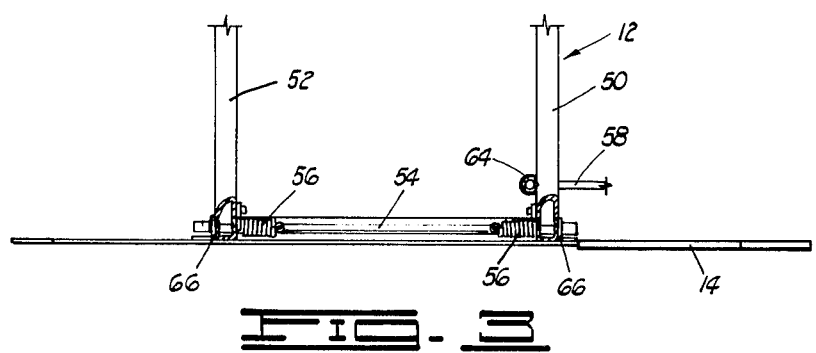
FIG. 3 is a side sectional view of one of the retractable rails mounted on the platform of the vehicle lift.

In FIG. 3 a front sectional view of the second rail 12 can be seen with the lower end portions of the third post 50 and fourth post 52 pivotally attached to the second pivot shaft 54. The pivot shaft 54 is secured to the top of the platform 14 by L-shaped mounting brackets 66. The lower end portion of the third post 50 and fourth post 52 are cut away to show the second pivot shaft 54 extending therethrough. It should be noted that one end of the coil springs 56 extends upwardly and is attached to the post 50 and 52 for providing a bias force thereon so that when the tension is relieved on the pivot cable 58 the springs 56 rotate the second rail 12 on the pivot shaft 54 folding it on top of the platform 14.

Figure 4:
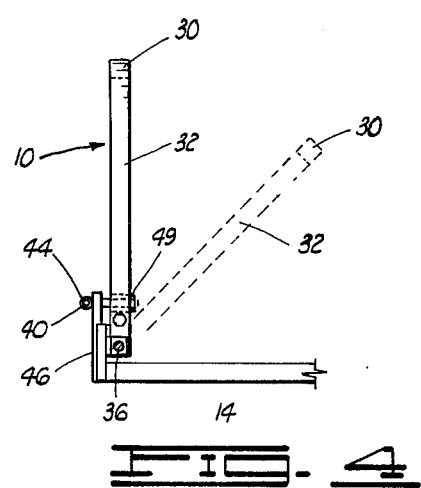
FIG. 4 is an end view of one of the retractable rails shown in a vertical position and in a lowered horizontal position shown in dotted lines.

In FIG. 4 an end view of the first rail is shown with the rail 10 in an upright vertical position on the platform 14. When the platform 14 is raised upwardly by the lift 16 the tension is relieved on the first pivot cable 40 and the coil springs 38 mounted around the pivot shaft 36 rotate the first rail 10 downwardly shown in dotted lines at a 45 degree angle.

In FIG. 5 the lift 16 has been activated and the platform 14 has been raised upwardly at an angle from the horizontal. In this position, as the platform 14 moves toward the opening 18 in the vehicle 20, the distance between the channel cable brackets 42 and 59 and the first post 32 and third post 50 is decreased, thereby relieving the tension on the first pivot cable 40 and second pivot cable 58. By relieving the tension the springs 38 and 56 now pivot the first rail 10 and second rail 12 downwardly into a folded position on top of the platform 14. In this view the second rail 12 can be seen folded under the first rail 10 as the rails 10 and 12 are retracted on top of the platform 14.

In FIG. 6 a front view of the platform 14 can be seen disposed in a vertical position which would be its normal position when it is retracted into the opening 18 of the vehicle 20. In this position the first rail 12 can be seen disposed on top of the platform 14 with the first rail 10 folded on top of the second rail 12 and the platform 14. in this position the tension on the first pivot cable 40 and second pivot cable 58 has been relieved and the bias force of the springs 38 and 56 have urged the posts 32, 34, 50 and 52 downwardly folding the rails 10 and 12 on top of the platform 14. It can be appreciated that when the lift 12 is again activated and the platform 14 is extended outwardly from the opening 18 in the vehicle 20, tension is again applied on the pivot cables 40 and 58 overcoming the bias force of the springs 38 and 56 and urging the rails 10 and 12 upwardly into a vertical position as shown in FIG. 1. When the rails 10 and 12 are again raised into a vertical position they may be gripped by persons disposed on the platform 14 as it is raised and lowered adjacent the vehicle 20.

Changes may be made in the construction and arrangement of the parts or elements of the embodiments are disclosed herein without departing from the spirit or scope of the invention as defined in the following claims.

What is claimed is:

1. A retractable rail for a vehicle lift, the lift having a platform disposed substantially in a vertical position in a door opening of a vehicle, the platform used for loading objects thereon when the platform is lowered into a horizontal position adjacent the door opening or to a position on the ground surface adjacent the vehicle, the rail comprising:
    a first hand support for gripping when the platform is lowered into a horizontal position;
    a first post having an upper end portion attached to said first hand support and a lower end portion pivotally attached to the platform;
    retraction means attached to said first post and the platform for lowering said first post and said first hand support on the platform when the platform is raised into a vertical position in the door opening; and
    extension means attached to said first post and the lift for raising said first post and said first hand support upwardly above the platform when the platform is lowered into a horizontal position.

2. The rail as described in claim 1 wherein said retraction means is a pivot shaft attached to the platform and the lower end portion of said first post, said pivot shaft having a coil spring mounted thereon, said coil spring engaging said first post and biasing said first post downwardly into a lowered position on top of the platform.

3. The rail as described in claim 2 wherein said extension means is a pivot cable having one end attached to the lift and the other end attached to said first post, when the platform is lowered into a horizontal position, said pivot cable is placed in tension thereby overcoming the bias force of said coil spring and raising said first post and said first hand support above the platform.

4. The rail as described in claim 1 further including a second post having an upper end portion attached to one end of said first hand support, said first post attached to the other end of said first hand support, the lower end portion of said first and second post pivotally attached to the platform.

5. A retractable rail for a vehicle lift, the lift having a platform disposed substantially in a vertical position in a door opening of a vehicle, the platform used for loading objects thereon when the platform is lowered to a horizontal position adjacent the door opening or to a position on the ground surface adjacent the vehicle, the rail comprising:
    a first hand support for gripping when the platform is lowered into a horizontal position;
    a first post having an upper end portion attached to one end of said first hand support and a lower end portion;
    a second post having an upper end portion attached to the other end of said first hand support and a lower end portion;
    a pivot shaft attached to the platform and the lower end portions of said first post and said second post, said pivot shaft having coil springs mounted thereon, said coil springs engaging said first post and said second post and biasing said posts downwardly into a lowered position on top of the platform; and
    a first pivot cable having one end attached to the lift and the other end attached to said first post, when the platform is lowered into a horizontal position, said first pivot cable placed in tension and overcoming the bias force of said coil springs and raising said first post, said second post, and said first hand support upwardly above the platform.

6. The rail as described in claim 5 further including a second hand support disposed opposite said first hand support on the platform and parallel thereto and a third post and fourth post having upper end portions attached to the opposite ends of said second hand support and lower end portions pivotally attached to a second pivot shaft attached to the platform and having coil springs mounted thereon, said coil springs engaging said third post and said fourth post and biasing said posts and said second hand support downwardly into a lowered position on top of the platform and on top of said first hand support, and a second pivot cable having one end attached to the lift and the other end attached to said third post when the platform is lowered into a horizontal position, said second pivot cable placed in tension and overcoming the bias force of said coil springs and raising said third post, said fourth post, and said second handrail upwardly above the platform.

7. The rail as described in claim 6 further including a fourth post having an upper end portion attached to one end of said second hand support and a lower end portion attached to said second pivot shaft, the upper end portion of said third post attached to the other end of said second hand support.

* * * * *